Oct. 19, 1926.
M. J. GILLITZER
1,603,913
BUTCHER'S GAMBREL
Filed April 6, 1926
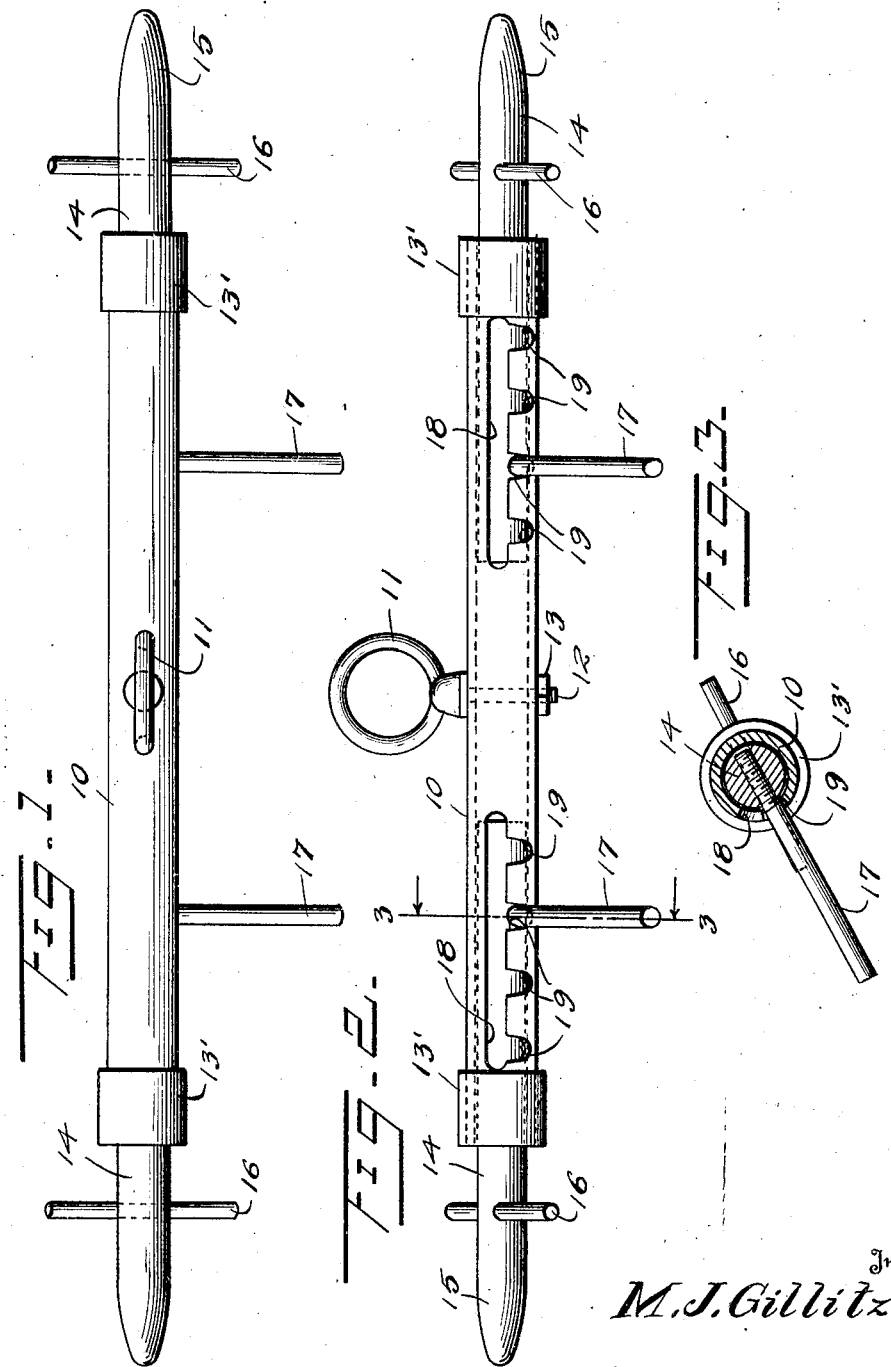
Inventor
M. J. Gillitzer
By Watson E. Coleman
Attorney Patented Oct. 19, 1926.

1,603,913

UNITED STATES PATENT OFFICE.

MIKE J. GILLITZER, OF PAYNESVILLE, MINNESOTA.

BUTCHER'S GAMBREL.

Application filed April 6, 1926. Serial No. 100,143.

This invention relates to butchers' gambrels and more particularly to a device intended to support the butchered animal which is adjustable to accommodate animals of varying sizes.

An important object of the invention is to provide a device of this character which may be readily held in any of its adjusted positions, which will be durable and efficient in service and which may be cheaply manufactured.

These and other objects I attain by the construction shown in the accompanying drawing, wherein for the purpose of illustration is shown a preferred embodiment of my invention and wherein:—

Figure 1 is a plan view of a hog gambrel constructed in accordance with my invention;

Figure 2 is a side elevation;

Figure 3 is a section on the line 3—3 of Figure 2.

Referring now more particularly to the drawing, the numeral 10 generally indicates a tube having its ends open and having at its center a supporting eye 11 having a shank in the form of a bolt 12 passing through the tube and secured by a nut 13. The tube is preferably formed from a length of galvanized pipe having its ends reinforced by bands 13'.

Slidably mounted in the ends of the tube are shafts 14, the outer ends of which are preferably tapered, as indicated at 15, so that they may be readily entered in the space between the shank and tendon of the animal's leg. Immediately inwardly of this tapered portion a transverse pin 16 is directed through the shaft and has its ends projected at opposite sides thereof to thereby provide means for limiting the movement of the leg upon the shaft section. That portion of each shaft which projects within the tube is provided with a radially projecting pin 17 which passes through a longitudinally extending slot 18 formed in the tube. This slot has along its lower edge a plurality of longitudinally spaced coves 19, the side walls of which incline slightly toward the longitudinal center of the tube, so that the pin when engaged therein may not be disengaged therefrom by the pressure applied by the weight of the animal. These pins are relatively long and made of strong material so that considerable force may be exerted thereagainst to assist in spreading the legs of the animal. To release the legs and permit the carcass to be removed from the gambrel, it is simply necessary to knock the pins upwardly until they escape the coves within which they are arranged and then shift the pins longitudinally of the slots.

It will, of course, be obvious that the construction hereinbefore set forth is capable of a certain range of change and modification without materially departing from the spirit of the invention and I accordingly do not limit myself to such specific structure except as hereinafter claimed.

I claim:—

1. A butcher's gambrel comprising a tube having its ends open and provided at its center with means whereby it may be supported, a shaft slidable in each end of the tube, each of said shafts having the outer end thereof tapered and having at its inner end a pin projecting through a longitudinally extending slot formed in the wall of the tube, said slot being formed in one wall thereof with a plurality of coves within which the pin may be engaged.

2. A butcher's gambrel comprising a tube having its ends open and provided at its center with means whereby it may be supported, a shaft slidable in each end of the tube, each of said shafts having the outer end thereof tapered and having at its inner end a pin projecting through a longitudinally extending slot formed in the wall of the tube, said slot being formed in one wall thereof with a plurality of coves within which the pin may be engaged, the walls of said coves slanting toward the longitudinal center of the tube.

In testimony whereof I hereunto affix my signature.

MIKE J. GILLITZER.